US012750005B2

(12) United States Patent
Au et al.

(10) Patent No.: US 12,750,005 B2
(45) Date of Patent: Sep. 29, 2026

(54) AUTOMATED SOLAR TRACKING COMPONENT INSTALLATION

(71) Applicant: Nextpower LLC, Fremont, CA (US)

(72) Inventors: Alexander W. Au, Oakland, CA (US); Jacob Mark Morin, Phoenix, AZ (US); Ricardo Delgado-Nanez, San Jose, CA (US); Abhimanyu Anil Sable, Hyderabad (IN); Jason Sean Henry, Palo Alto, CA (US)

(73) Assignee: Nextpower LLC, Fremont, CA (US)

( * ) Notice: Subject to any disclaimer, the term of this patent is extended or adjusted under 35 U.S.C. 154(b) by 0 days.

(21) Appl. No.: 18/979,078

(22) Filed: Dec. 12, 2024

(65) Prior Publication Data

US 2025/0202413 A1 Jun. 19, 2025

Related U.S. Application Data

(60) Provisional application No. 63/610,286, filed on Dec. 14, 2023.

(51) Int. Cl.

| | |
|---|---|
| ***H02S 20/32*** | (2014.01) |
| ***B25J 11/00*** | (2006.01) |
| ***F16B 9/02*** | (2006.01) |

(52) U.S. Cl.

CPC ............. *H02S 20/32* (2014.12); *B25J 11/005* (2013.01); *F16B 9/02* (2013.01)

(58) Field of Classification Search

None

See application file for complete search history.

(56) References Cited

U.S. PATENT DOCUMENTS

| | | | | |
|---|---|---|---|---|
| 2010/0199972 | A1* | 8/2010 | Brost | F24S 30/425 126/685 |
| 2014/0246549 | A1* | 9/2014 | West | H02S 20/23 248/220.22 |
| 2019/0018217 | A1 | 1/2019 | Werner et al. | |
| 2021/0379757 | A1 | 12/2021 | Schneider et al. | |
| 2022/0193927 | A1* | 6/2022 | Mazzetti, Jr. | B25J 9/1697 |

(Continued)

FOREIGN PATENT DOCUMENTS

| | | |
|---|---|---|
| AU | 2021331337 A1 | 3/2023 |
| WO | 2022177645 A1 | 8/2022 |

OTHER PUBLICATIONS

International Searching Authority, "Partial Search Report and Written Opinion" , From Application No. PCT/US2024/059826, Mailed Feb. 27, 2025, pp. 14.

(Continued)

*Primary Examiner* — Dustin Q Dam

(74) *Attorney, Agent, or Firm* — Fredrikson & Byron, P.A.

(57) ABSTRACT

A method for automated, or semi-automated, solar module support rail installation at a solar tracking system includes placing a first solar module support rail at a first location along a torque tube of the solar tracking system; using a robotic device to fixate the first solar module support rail at the first location along the torque tube; moving the robotic device to a second, different location along the torque tube; placing a second solar module support rail at the second, different location along the torque tube; and using the robotic device to fixate the second solar module support rail at the second location along the torque tube.

17 Claims, 6 Drawing Sheets

(56) References Cited

U.S. PATENT DOCUMENTS

| | | | | |
|---|---|---|---|---|
| 2023/0015330 | A1 | 1/2023 | Schuknecht et al. | |
| 2023/0402960 | A1 * | 12/2023 | Taha | F24S 25/63 |

OTHER PUBLICATIONS

International Searching Authority, "International Search Report and Written Opinion" , From Application No. PCT/US2024/059826, Mailed Apr. 17, 2025, pp. 20.

* cited by examiner

AUTOMATED SOLAR TRACKING COMPONENT INSTALLATION

RELATED APPLICATION

This disclosure claims priority to U.S. provisional patent application No. 63/610,286 filed on Dec. 14, 2023, the contents of which are hereby incorporated by reference.

TECHNICAL FIELD

This disclosure relates generally to device, system, and method embodiments for automated, or semi-automated, installation of one or more components of a solar tracker system. Embodiments disclosed herein can help to reduce costs and timelines associated with solar tracker system installation and, thereby, can help to increase the applicability of solar tracker system applications.

BACKGROUND

Solar modules can convert sunlight into energy using photovoltaic cells. Solar tracking systems can support a plurality of solar modules and function to rotate these solar modules amongst a variety of different angular orientations throughout a given day to optimize a solar irradiance angle and, thereby, optimize energy generation at the solar modules.

A conventional solar tracking system includes a plurality of components assembled and installed on site in the field at the location where the solar tracking system is to operate. Typical solar tracking system component installation utilizes manual labor on site in the field. For example, typical solar tracking system component installation utilizes manual labor to install rails at a torque tube for supporting one or more solar modules at the torque tube. This typically requires a high degree of manual labor to both place and secure the rails at the torque tube and can induce a degree of error to the installation process. Moreover, oftentimes solar tracking systems are installed in relatively remote locations and thus installation necessitates costs associated with bringing manual labor to the relatively remote site to execute manual installation over what can be a significant period of time. As such, current typical manual labor solar tracking system component installation can add significant cost to a solar tracking system application.

SUMMARY

This disclosure in general describes embodiments of devices, systems, and methods for automated, or semi-automated, installation of one or more components of a solar tracker system. Such embodiments disclosed herein can be useful in reducing costs and timelines associated with solar tracking system installation by reducing or eliminating the need for manual labor to install one or more components of a solar tracking system.

Embodiments described herein are disclosed with respect to one exemplary application relating to installation of a solar module support rail component of a solar tracking system. In this exemplary application, a robotic device can be used to place and/or fixate one or more solar module support rails at a torque tube of the solar tracking system. For example, the robotic device can be configured to place a first solar module support rail at the torque tube and then fixate that first solar module support rail at the torque tube. The one or more solar module support rails can be configured to facilitate at least semi-automated (e.g., fully automated) installation of such one or more solar module support rails. For instance, the one or more solar module support rails can include one or more fixation apertures adapted for automated fixation of such one or more solar module support rails at the torque tube and/or the one or more solar module support rails can be configured to receive one or more fixation members placed by a robotic device. Such embodiments can thus enable a robotic device to install one or more solar module support rails at a torque tube by enabling the robotic device to seamlessly place the one or more solar module support rails at the torque tube and/or fixate such one or more solar module support rails at the torque tube.

One embodiment includes a method for automated, or semi-automated, solar module support rail installation at a solar tracking system. This method embodiment includes placing a first solar module support rail at a first location along a torque tube of the solar tracking system; using a robotic device to fixate the first solar module support rail at the first location along the torque tube; moving the robotic device to a second, different location along the torque tube; placing a second solar module support rail at a the second, different location along the torque tube; and using the robotic device to fixate the second solar module support rail at the second location along the torque tube.

In a further embodiment of this method, the robotic device can be used to place the first solar module support rail at the first location along the torque tube and/or to place the second solar module support rail at the second location along the torque tube. As one such example, this can include using an aperture locating sensor (e.g., an optical sensor) at the robotic device to locate a first torque tube fixation aperture at the first location along the torque tube. For instance, the aperture locating sensor at the robotic device can be configured to locate the first torque tube fixation aperture at the first location along the torque tube while a placement arm of the robotic device holds the first solar module support rail. In one such example, the first solar module support rail can include at least one support rail fixation aperture, and the robotic device can hold the first solar module support rail with a location of the at least one support rail fixation aperture registered at the robotic device (e.g., the robotic device can hold the first solar module support rail with the location of the at least one support rail fixation aperture, registered at the robotic device, relative to the placement arm of the robotic device holding the first solar module support rail). Once the robotic device has been used to locate the first torque tube fixation aperture at the first location along the torque tube, the robotic device can then be actuated to place the first solar module support rail relative to the located first torque tube fixation aperture. For instance, once the robotic device has been used to locate the first torque tube fixation aperture at the first location along the torque tube, the placement arm of the robotic device, holding the first solar module support rail, can be actuated to place the first solar module support rail relative to the located first torque tube fixation aperture at the first location along the torque tube. The robotic device can likewise be used similarly to place the second solar module support rail at the second location along the torque tube as well as any additional solar module support rails to be installed at that same torque tube.

In a further embodiment of this method, using the robotic device to fixate the first solar module support rail at the first location along the torque tube and/or fixate the second solar module support rail at the second location along the torque tube can include using the robotic device to install a fastening assembly at the first solar module support rail to fixate the first solar module support rail at the torque tube at the first location and/or to install a fastening assembly at the second solar module support rail to fixate the second solar module support rail at the torque tube at the second location. For example, a fastening arm of the robotic device can be used (e.g., after placing the first solar module support rail at the first location along the torque tube) to install a first fastening assembly at the first solar module support rail to fixate the first solar module support rail at the torque tube at the first location, where the first fastening assembly includes a clamping plate and a fastening member (e.g., a blind rivet). Similarly, the fastening arm of the robotic device can be used (e.g., after placing the second solar module support rail at the second location along the torque tube) to install a second fastening assembly at the second solar module support rail to fixate the second solar module support rail at the torque tube at the second location, where the second fastening assembly includes a clamping plate and a fastening member (e.g., a blind rivet). In one particular such example, the fastening arm of the robotic device can be used to drive the fastening member through the clamping plate and then through the respective solar module support rail (e.g., through the located torque tube fixation aperture). In some such instances, the fastening arm of the robotic device can be configured to hold the clamping plate and the fastening member, and the fastening arm of the robotic device can further be configured to place the clamping plate at the respective solar module support rail in alignment with the respective solar module support rail fixation aperture and then to drive the fastening member through the clamping plate and through the respective solar module support rail fixation aperture.

An additional embodiment includes a solar module support rail assembly that is adapted for automated installation at a solar tracking system. This embodiment of the solar module support rail assembly includes a solar module support rail and a fastening assembly. For instance, the solar module support rail assembly can be configured to installation by a robotic device. The solar module support rail assembly can include the solar module support rail that has at least one rail fixation aperture (e.g., only a single rail fixation aperture; two or more rail fixation apertures). And the solar module support rail assembly can include the fastening assembly that includes a clamping plate and a fastening member. The clamping plate can include a clamping plate fixation aperture, and the clamping plate can be configured to interface with (e.g., sit directly on) the solar module support rail, for instance, in alignment with the rail fixation aperture at the solar module rail support. The fastening member can be configured to be received at the clamping plate fixation aperture and at the rail fixation aperture so as to fixate the clamping plate at the solar module support rail and to fixate the solar module support rail at the torque tube (e.g., at the torque tube fixation aperture).

In further embodiments of this solar module support rail assembly, the solar module support rail can include various numbers of rail fixation apertures at various locations, for instance, depending on the configuration of a robotic device that can be used to install the solar module support rail assembly. In one such example, the solar module support rail assembly can include the solar module support rail having a single rail fixation aperture, such as at a central longitudinal region of the solar module support rail. In another such example, the solar module support rail assembly can include the solar module support rail having two rail fixation apertures at generally opposite longitudinal end portions of the solar module support rail.

In a further embodiment of this solar module support rail assembly, the clamping plate can be non-planar. For example, in many applications, the torque tube of the solar tracking system may have a curved (e.g., cylindrical) cross-sectional shape, and, to suitably fit at the curved torque tube, the solar module rail support can have a complementary curved cross-sectional shape. To help facilitate a generally flush interface between the clamping plate and the solar module rail support, the clamping plate can define a generally curved (e.g., "C" shaped) member that is adapted to sit generally flush at the solar module support rail (e.g., to sit generally flush at the curved central longitudinal region of the solar module support rail such that the clamping plate fixation aperture is in alignment with the rail fixation aperture located at this curved central longitudinal region of the solar module support rail).

In further embodiments of this solar module support rail assembly, the fastening member can be a variety of one or more fastening members suited for the intended solar tracking system application of the solar module support rail. As one example, the fastening member can be a blind rivet that is configured to fixate the clamping plate to the solar module support rail and to fixate the solar module support rail to the torque tube.

Another embodiment includes a robotic device. This embodiment of the robotic device includes programmable processing circuitry, a motive source coupled to the programmable processing circuitry, a power source coupled to the programmable processing circuitry, a placement arm coupled to the programmable processing circuitry, and a fastening arm coupled to the programmable processing circuitry. The motive source can be configured to move the robotic device relative to a torque tube of a solar tracking system. The power source can be configured to provide power to one or more power-consuming components at the robotic device and can, for instance, be a rechargeable electrical battery. The placement arm can be configured to hold at least one solar module support rail. The fastening arm can be configured (e.g., after the placement arm has placed the solar module support rail at the torque tube) to install a fastening assembly at the solar module support rail to fixate the solar module support rail at the torque tube.

In a further embodiment of this robotic device, the robotic device can include an aperture locating sensor. The aperture locating sensor can be configured to locate a torque tube fixation aperture at a location along the torque tube. For instance, the aperture locating sensor at the robotic device can be configured to locate the torque tube fixation aperture at the location along the torque tube while the placement arm of the robotic device holds the first solar module support rail. The aperture locating sensor can provide data to the programmable processing circuitry, and the programmable processing circuitry can be configured to compare this received data from the aperture locating sensor to a preset torque tube fixation aperture identification threshold (e.g., using an optical aperture locating sensor and using image pattern-recognition to determine the preset torque tube fixation aperture identification threshold). When the programmable processing circuitry determines that the data from the aperture locating sensor meets or exceeds the preset torque tube fixation aperture identification threshold, the programmable processing circuitry can be configured to actuate the placement arm, holding the solar module support rail, to place the solar module support rail relative to the determined/identified fixation aperture.

The details of one or more examples are set forth in the accompanying drawings and the description below. Other features, objects, and advantages will be apparent from the description and drawings.

BRIEF DESCRIPTION OF DRAWINGS

The following drawings are illustrative of particular examples of the present invention and therefore do not limit the scope of the invention. The drawings are intended for use in conjunction with the explanations in the following detailed description wherein like reference characters denote like elements. Examples of the present invention will hereinafter be described in conjunction with the appended drawings.

FIG. 2A shows an exploded, perspective view of the solar module support rail assembly relative to a torque tube, and FIG. 2B shows an installed, perspective view of the solar module support rail assembly installed at the torque tube.

FIG. 3A shows a perspective view from a longitudinal side of the solar module support rail assembly installed at the torque tube, and FIG. 3B shows a perspective view from a radial side of the solar module support rail assembly installed at the torque tube.

DETAILED DESCRIPTION

The following detailed description is exemplary in nature and is not intended to limit the scope, applicability, or configuration of the invention in any way. Rather, the following description provides some practical illustrations for implementing examples of the present invention. Those skilled in the art will recognize that many of the noted examples have a variety of suitable alternatives.

Embodiments disclosed herein include various devices, systems, and methods configured to help reduce cost and time associated with solar tracking system installation. Embodiments disclosed herein can be configured for automated, or semi-automated, installation of one or more components of a solar tracker system. Such embodiments disclosed herein can, therefore, be useful in reducing costs and timelines associated with solar tracking system installation by reducing or eliminating the need for manual labor to install one or more components of a solar tracking system. Such embodiments are disclosed herein with respect to one exemplary application relating to automated, or semi-automated, installation of a solar module support rail component of a solar tracking system. For instance, in this exemplary application, a robotic device can be used to place and/or fixate one or more solar module support rails at a torque tube of the solar tracking system. While these embodiments are disclosed herein with respect to one exemplary application relating to automated, or semi-automated, installation of a solar module support rail component of a solar tracking system, other applications relating to automated, or semi-automated, installation of other types of solar tracking systems components are within the scope of the present disclosure.

Figure 1:
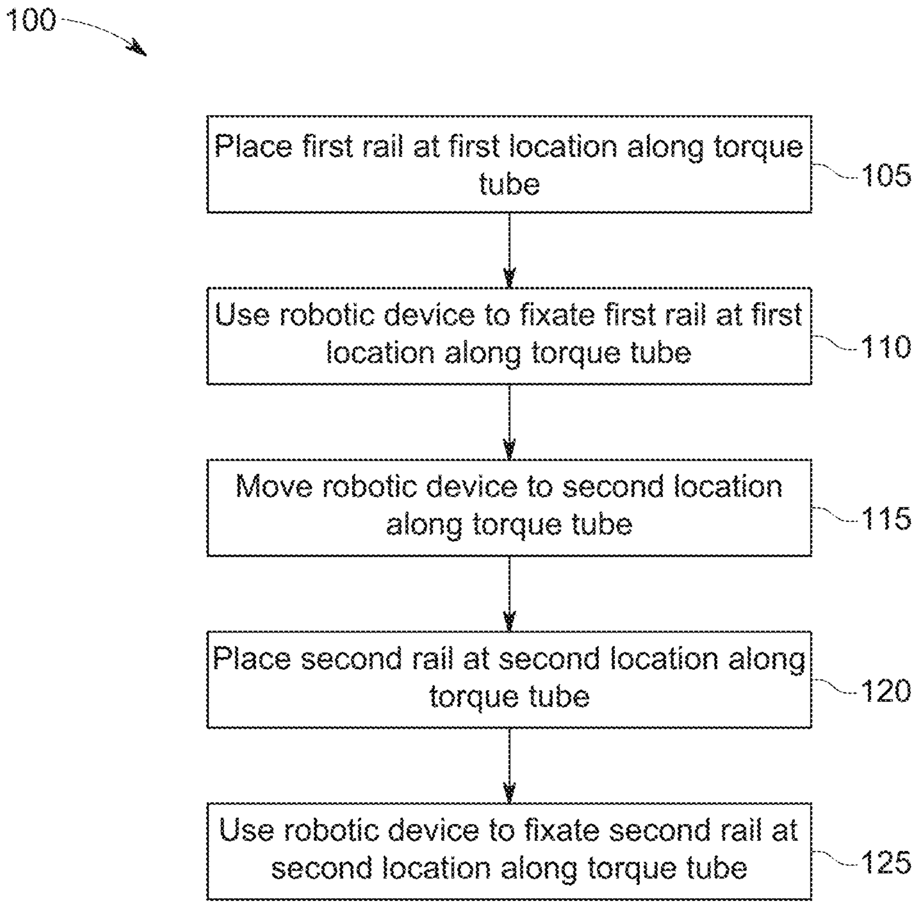
FIG. 1 is a flow diagram of an embodiment of a method for automated, or semi-automated, solar module support rail installation at a solar tracking system.

FIG. 1 shows a flow diagram of an embodiment of a method 100 for automated, or semi-automated, solar module support rail installation at a solar tracking system. FIGS. 2A-2B and 3A-3B will then be referenced to describe exemplary applications of the method 100 as well as exemplary embodiments of solar module support rail assemblies. Such solar module support rail assemblies disclosed herein can be configured for automated, or semi-automated, installation at a solar tracking system.

At step 105, the method 100 includes placing a first solar module support rail at a first location along a torque tube. In some examples, the first solar module support rail can be placed at the first location along the torque tube manually (e.g., by hand). In other examples, the first solar module support rail can be placed at the first location along the torque tube in an automated manner, for instance, using a robotic device to place the first solar module support rail at the first location along the torque tube. In various applications of the method 100, placing the first solar module support rail at the first location along the torque tube can include placing a support rail fixation aperture at the first solar module support rail in alignment with a torque tube fixation aperture at the first location along the torque tube. As one particular such example, step 105 can include placing the first solar module support rail in contact with the torque tube at the first location along the torque tube and placing the support rail fixation aperture at the first solar module support rail in alignment with the torque tube fixation aperture at the first location along the torque tube.

Certain such examples where the robotic device is used to place the first solar module support rail at the first location along the torque tube can include using an aperture locating sensor (e.g., an optical sensor) at the robotic device to locate a first torque tube fixation aperture at the first location along the torque tube. For instance, the aperture locating sensor at the robotic device can be configured to locate the first torque tube fixation aperture at the first location along the torque tube while a placement arm of the robotic device holds the first solar module support rail prior to placement at the torque tube. In one such example, the first solar module support rail can include at least one support rail fixation aperture, and the robotic device can hold the first solar module support rail with a location of the at least one support rail fixation aperture registered at the robotic device. In one particular such example, for instance, the robotic device can hold the first solar module support rail with the location of the at least one support rail fixation aperture, registered at the robotic device, relative to the placement arm of the robotic device holding the first solar module support rail. Then, once the robotic device has been used to locate the first torque tube fixation aperture at the first location along the torque tube, the robotic device can then be actuated to place the first solar module support rail relative to the located first torque tube fixation aperture. For instance, once the robotic device has been used to locate the first torque tube fixation aperture at the first location along the torque tube, the placement arm of the robotic device, holding the first solar module support rail, can be actuated to place the first solar module support rail relative to the located first torque tube fixation aperture at the first location along the torque tube.

At step 110, the method 100 includes using a robotic device to fixate the first solar module support rail at the first location along the torque tube. This can include using the robotic device to install a first fastening assembly at the first solar module support rail to fixate the first solar module support rail at the torque tube at the first location.

For example, the robotic device can include a fastening arm that is configured to install the first fastening assembly at the first solar module support rail to fixate the first solar module support rail at the torque tube at the first location. For instance, after placing the first solar module support rail at the first location along the torque tube at step 105, at step 110 the fastening arm of the robotic device can be used to install the first fastening assembly at the first solar module support rail to fixate the first solar module support rail at the torque tube at the first location.

The first fastening assembly can include a clamping plate and a fastening member, and the robotic device can be configured to install the first fastening assembly at the first solar module support rail to fixate the first solar module support rail at the torque tube at the first location. In such an example, the fastening arm of the robotic device can be used at step 110 to drive the fastening member, of the first fastening assembly, through the clamping plate, of the first fastening assembly, and then through the first solar module support rail (e.g., through the located torque tube fixation aperture). In some such instances, the fastening arm of the robotic device can be configured to hold the clamping plate and the fastening member, and the fastening arm of the robotic device can further be configured to place the clamping plate at the first solar module support rail in alignment with the first solar module support rail fixation aperture and then to drive the fastening member through the clamping plate, through the first solar module support rail fixation aperture, and at least partially into the torque tube fixation aperture.

In one embodiment, the fastening member of the first fastening assembly can be, or otherwise include, include a blind rivet. In this exemplary embodiment, step 110 can include using the fastening arm of the robotic device to drive the blind rivet through the clamping plate and then through the first solar module support rail (e.g., through the located first torque tube fixation aperture). Using the fastening arm of the robotic device to drive the blind rivet as such can include, for instance, inserting a body of the blind rivet into the clamping plate aperture, into the first solar module support rail aperture, and into the first torque tube fixation aperture. Once so installed, the fastening arm of the robotic device can be actuated to cause the blind rivet to be secured at each of the clamping plate aperture, the first solar module support rail aperture, and the first torque tube fixation aperture. For instance, the blind rivet can include a mandrel extending through the body of the blind rivet, and the fastening arm of the robotic device can be actuated to cause the blind rivet to be secured at each of clamping plate aperture, the first solar module support rail aperture, and the first torque tube fixation aperture by applying an actuation force at the mandrel of the blind rivet which can act to cause the blind rivet to anchor at each of the clamping plate aperture, the first solar module support rail aperture, and the first torque tube fixation aperture. One exemplary embodiment of such a blind rivet used as the fastening member can include the blind rivet as a single, integral blind rivet component with integrated body and mandrel (e.g., such that this blind rivet having the integral body and mandrel is a single BOM/bill of material).

At step 115, the method 100 includes moving the robotic device to a second, different location along the torque tube. For example, after the robotic device has been used to fixate the first solar module rail assembly at the first location along the torque tube (e.g., at step 110), the robotic device, at step 115, can be moved (e.g., relative to the torque tube) to the second, different location along the torque tube. In one particular such example, the robotic device, at step 115, can move relative to the torque tube and away from the first location along the torque tube at stop moving relative to the torque tube when the robotic device arrives at the second, different location along the torque tube having a second, different torque tube fixation aperture. For instance, for applications where the robotic device includes the aperture locating sensor, at step 115 the robotic device can move relative to the torque tube and away from the first location along the torque tube (e.g., where the solar module support rail was fixated at step 110) while using the aperture locating sensor directed toward the torque tube to detect a presence of the second torque tube fixation aperture at the second, different location along the torque tube. Then, when the robotic device detects the presence of the second torque tube fixation aperture (e.g., when the robotic device determines that data from the aperture locating sensor meets or exceeds the preset torque tube fixation aperture identification threshold), at step 115, movement of the robotic device relative to the torque tube can be terminated. As such, at step 115, the robotic device can move from the installed, fixated location of the first solar module support rail at the torque tube to a different location along the torque tube having a torque tube fixation aperture at which a second, different solar module support rail can be installed at the torque tube.

At step 120, the method 100 includes placing a second, different solar module support rail at a second, different location along the torque tube. In some examples, the second solar module support rail can be placed at the second location along the torque tube manually (e.g., by hand). In other examples, the second solar module support rail can be placed at the second location along the torque tube in an automated manner, for instance, using a robotic device to place the second solar module support rail at the second location along the torque tube. In various applications of the method 100, placing the second solar module support rail at the second location along the torque tube can include placing a support rail fixation aperture at the second solar module support rail in alignment with a second torque tube fixation aperture at the second location along the torque tube. As one particular such example, step 120 can include placing the second solar module support rail in contact with the torque tube at the second location along the torque tube and placing the support rail fixation aperture at the second solar module support rail in alignment with the second torque tube fixation aperture at the second location along the torque tube.

Certain such examples where the robotic device is used to place the second solar module support rail at the second location along the torque tube can include using the aperture locating sensor at the robotic device to locate the second torque tube fixation aperture at the second location along the torque tube, for instance, similar to that described elsewhere herein with respect to using the aperture locating sensor at the robotic device to locate the first torque tube fixation aperture at the first location. For instance, the aperture locating sensor at the robotic device can be configured to locate the second torque tube fixation aperture at the second location along the torque tube while the placement arm of the robotic device holds the second solar module support rail prior to placement at the torque tube. In one such example, the second solar module support rail can include at least one support rail fixation aperture, and the robotic device can hold the second solar module support rail with a location of the at least one support rail fixation aperture registered at the robotic device. In one particular such example, for instance, the robotic device can hold the second solar module support rail with the location of the at least one support rail fixation aperture, registered at the robotic device, relative to the placement arm of the robotic device holding the second solar module support rail. Then, once the robotic device has been used to locate the second torque tube fixation aperture at the second location along the torque tube, the robotic device can then be actuated to place the second solar module support rail relative to the located second torque tube fixation aperture. For instance, once the robotic device has been used to locate the second torque tube fixation aperture at the second location along the torque tube, the placement arm of the robotic device, holding the second solar module support rail, can be actuated to place the second solar module support rail relative to the located second torque tube fixation aperture at the second location along the torque tube.

At step 125, the method 100 includes using the robotic device to fixate the second solar module support rail at the second location along the torque tube. This can include using the robotic device to install a second fastening assembly at the second solar module support rail to fixate the second solar module support rail at the torque tube at the second location.

For example, the robotic device can include the fastening arm that is configured to install the second fastening assembly at the second solar module support rail to fixate the second solar module support rail at the torque tube at the second location. For instance, after placing the second solar module support rail at the second location along the torque tube at step 120, at step 125 the fastening arm of the robotic device can be used to install the second fastening assembly at the second solar module support rail to fixate the second solar module support rail at the torque tube at the second location. In some embodiments, the second fastening assembly can be similar to, or the same as, the first fastening assembly described elsewhere herein (e.g., the second fastening assembly can be, or otherwise include, include a blind rivet). For instance, the second fastening assembly, like the first fastening assembly, can include a clamping plate and a fastening member, and the robotic device can be configured to install the second fastening assembly at the second solar module support rail to fixate the second solar module support rail at the torque tube at the second location. In such an example, the fastening arm of the robotic device can be used at step 125 to drive the fastening member, of the second fastening assembly, through the clamping plate, of the second fastening assembly, and then through the second solar module support rail (e.g., through the located second torque tube fixation aperture). In some such instances, the fastening arm of the robotic device can be configured to hold the clamping plate and the fastening member of the second fastening assembly, and the fastening arm of the robotic device can further be configured to place the clamping plate of the second fastening assembly at the second solar module support rail in alignment with the second solar module support rail fixation aperture and then to drive the fastening member of the second fastening assembly through the clamping plate of the second fastening assembly, through the second solar module support rail fixation aperture, and at least partially into the second torque tube fixation aperture. In examples where the fastening member of the second fastening assembly is a blind rivet, step 125 can include using the fastening arm of the robotic device to drive the blind rivet of the second fastening assembly through the clamping plate of the second fastening assembly and then through the second solar module support rail and into the second torque tube fixation aperture (e.g., similar to that described at step 110 elsewhere herein).

FIGS. 2A-2B and 3A-3B illustrate exemplary embodiments of solar module support rail assemblies that can be configured for automated, or semi-automated, installation at a solar tracking system. For example, the solar module support rail assembly embodiments shown at FIGS. 2A-2B and 3A-3B can be configured for automated, or semi-automated, installation at a torque tube of a solar tracking system, for instance, using a robotic device as disclosed elsewhere herein with respect to the method 100.

Figure 2A:
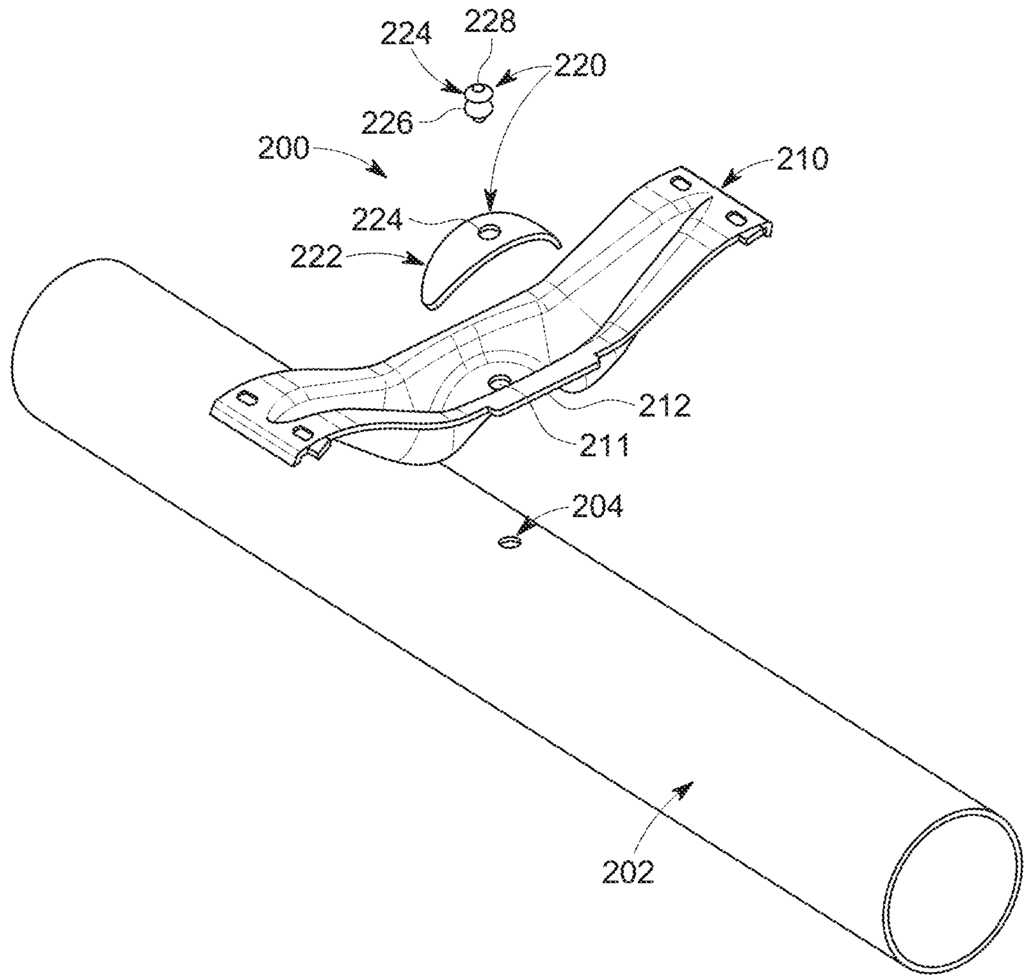
FIGS. 2A and 2B illustrate one embodiment of a solar module support rail assembly.
Figure 2B:
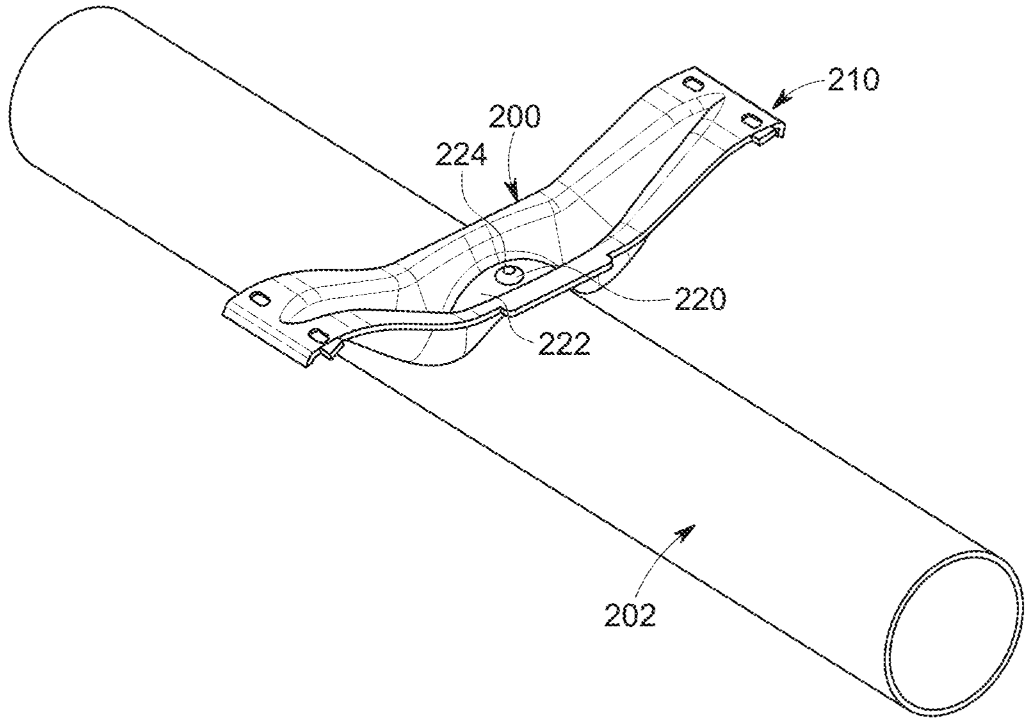

FIGS. 2A and 2B illustrate one embodiment of a solar module support rail assembly 200. FIG. 2A shows an exploded, perspective view of the solar module support rail assembly 200 relative to a torque tube 202, and FIG. 2B shows an installed, perspective view of the solar module support rail assembly 200 installed at the torque tube 202.

The solar module support rail assembly 200 can be configured for automated installation at a solar tracking system, for instance, using a robotic device, such as disclosed elsewhere herein. The illustrated embodiment of the solar module support rail assembly 200 includes a solar module support rail 210 and a fastening assembly 220.

The solar module support rail 210, of solar module support rail assembly 200, can include at least one rail fixation aperture 211. The illustrated embodiment of the solar module support rail 210 has a single rail fixation aperture 211. Also, the illustrated embodiment of the solar module support rail 210 has this rail fixation aperture 211 located at a central longitudinal region 212 of the solar module support rail 210. For instance, the central longitudinal region 212 of the solar module support rail 210 can span a longitudinal length at the solar module support rail 210 that is non-planar. The illustrated embodiment shows the central longitudinal region 212 of the solar module support rail 210 including a convex curvature spanning a longitudinal length along the central longitudinal region 212, and the rail fixation aperture 211 (e.g., the single rail fixation aperture 211) is located at this convex curvature at the central longitudinal region 212 of the solar module support rail 210. Notably, the rail fixation aperture 211 can be located at this central longitudinal region 212 that also receives the torque tube 202 thereat.

The fastening assembly 220, of solar module support rail assembly 200, can include at least a clamping plate 222 and a fastening member 224.

The clamping plate 222 can include a clamping plate fixation aperture 224. The clamping plate 222 can be configured to interface with (e.g., sit directly on) the solar module support rail 210, for instance, in alignment with the rail fixation aperture 211 at the solar module rail support 210. For instance, the clamping plate 222 can be configured to interface with (e.g., sit directly on) the solar module support rail 210 such that the clamping plate fixation aperture 224 (e.g., at the central longitudinal region 212) is aligned with the rail fixation aperture 211 at the solar module rail support 210. In one embodiment, the clamping plate 222 can have a relatively high material strength, for instance, the clamping plate 222 can be made, at least in part, of steel.

The illustrated embodiment shows the clamping plate 222 as a non-planar member. For example, in many applications, the torque tube 202, as shown here, can have a curved (e.g., cylindrical) cross-sectional shape, and, to suitably fit at the curved torque tube 202, the solar module rail support 210 can have a complementary curved cross-sectional shape, such as at the central longitudinal region 212 where the torque tube 202 is received at the solar module rail support 210. Thus, in such applications, to help facilitate a generally flush interface between the clamping plate 222 and the solar module rail support 210, the clamping plate 222 can define a generally curved (e.g., "C" shaped) member that is adapted to sit generally flush at the solar module support rail 210 (e.g., to sit generally flush at the curved central longitudinal region 212 of the solar module support rail 210 such that the clamping plate fixation aperture 224 is in alignment with the rail fixation aperture 211 located at this curved central longitudinal region 212 of the solar module support rail 210).

The fastening member 224 can be configured to be received at the clamping plate fixation aperture 224 and at the rail fixation aperture 211 so as to fixate the clamping plate 222 at the solar module support rail 210 and to fixate the solar module support rail 210 at the torque tube 202 (e.g., at a torque tube fixation aperture 204). The fastening member 224 can be any one or more of a variety of fastening members suited for the intended solar tracking system application of the solar module support rail 210. As one example, the fastening member 224 is illustrated here as a blind rivet that is configured to fixate the clamping plate 222 to the solar module support rail 210 and to fixate the solar module support rail 210 to the torque tube 202. According to this example, the blind rivet fastening member 224 can include a body 226 and a mandrel 228. The body 226 of the blind rivet fastening member 224 can be configured to be inserted into the clamping plate aperture 224, into the solar module support rail aperture 211, and into the first torque tube fixation aperture 204, for instance, using a robotic device, such as a fastening arm of a robotic device. Once so installed, the fastening arm of the robotic device can be actuated to cause the blind rivet fastening member 224 to be secured at each of the clamping plate aperture 224, the solar module support rail aperture 211, and the torque tube fixation aperture 204. For instance, the mandrel 228 can extend through the body 226 of the blind rivet fastening member 224, and the fastening arm of the robotic device can be actuated to cause the blind rivet fastening member 224 to be secured at each of clamping plate aperture 224, the solar module support rail aperture 211, and the torque tube fixation aperture 204 by applying an actuation force at the mandrel 228 which can act to cause the blind rivet fastening member 224 to anchor at each of the clamping plate aperture 224, the solar module support rail aperture 211, and the torque tube fixation aperture 204. The illustrated embodiment of the blind rivet fastening member 224 shown here is a single, integral blind rivet component with integrated body 226 and mandrel 228 such that this blind rivet fastening member 224 has the integral body 226 and mandrel 228 as a single BOM/bill of material.

The fastening assembly 220 can be configured to transfer force loads between the torque tube 202 and the solar module support rail 210. As one example, the solar tracking system can act to rotate the torque tube 202 to change an orientation of one or more solar modules fixated at the torque tube 202, via solar module support rails, such as the solar module support rail 210, relative to the sun. Doing so can cause force loads to be imparted on the fastening assembly 220. The clamping plate 222 disclosed herein can be thus configured to help effectively transfer force loads between the torque tube 202 and the solar module support rail 210. For instance, the non-planar, generally curved clamping plate 222 can be configured to wrap around the curved central longitudinal region 212 of the solar module support rail 210. This, in turn, can help the clamping plate to transfer force loads from the torque tube 202 to the solar module support rail 210 and/or to transfer force loads from the solar module support rail 210 to the torque tube 202.

The illustrated embodiment of the fastening assembly 220, of solar module support rail assembly 200, can have a single solar module support rail aperture 211 and fasten the solar module support rail 210 with a single fastening assembly 220. As such, the illustrated embodiment of the fastening assembly 220, of solar module support rail assembly 200, can be adapted to fixate the solar module support rail 210 at the torque tube 202 using a robotic device. For instance, this exemplary embodiment of the fastening assembly 220, can necessitate only installation of one fastening member 224 at one torque tube fixation aperture 204, and this installation of the one fastening member 224 at one torque tube fixation aperture 204 can be executed using a robotic device as a result of the disclosed structure of each of the solar module support rail 210 and the fastening assembly 220 being adapted for installation by the robotic device. This can include the disclosed location(s) of the rail fixation aperture 211 at the solar module support rail 210 and complementary configuration of the fastening assembly 220 adapted for robotic fixation of the solar module support rail 210 to the torque tube 202.

Figure 3A:
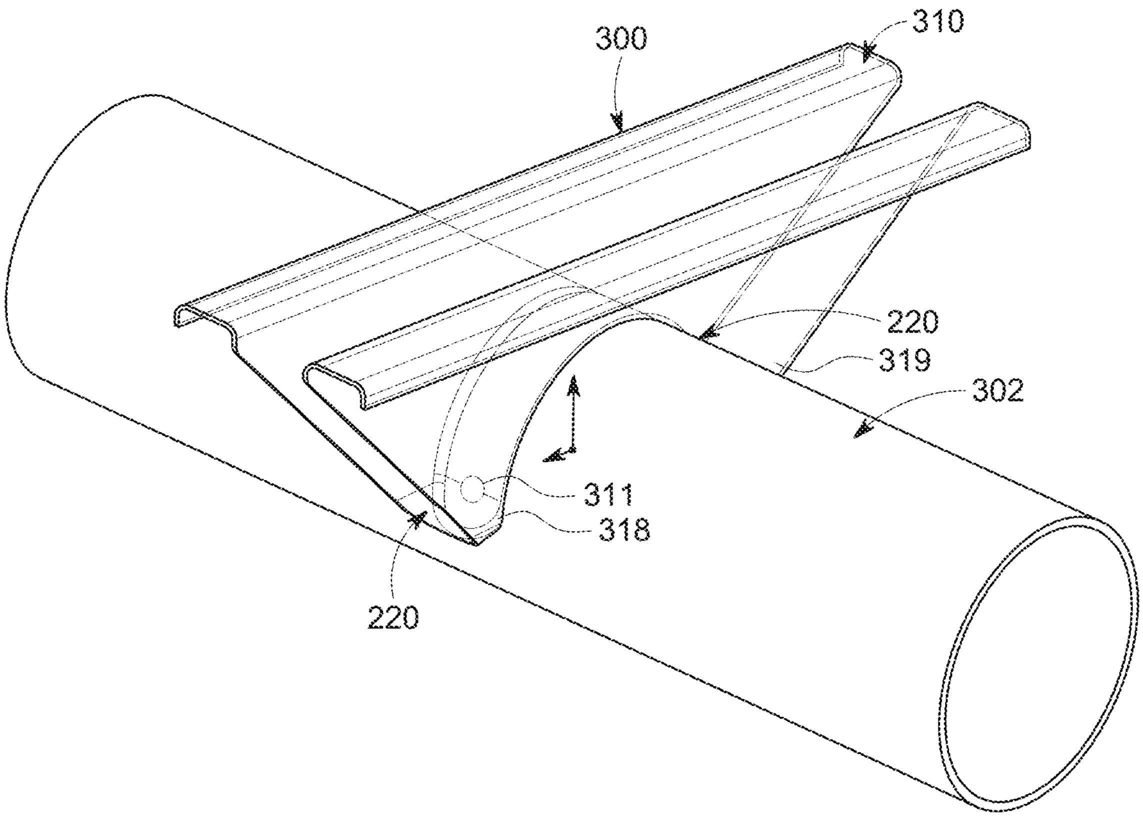
FIGS. 3A and 3B illustrate another embodiment of a solar module support rail assembly installed at a torque tube.
Figure 3B:
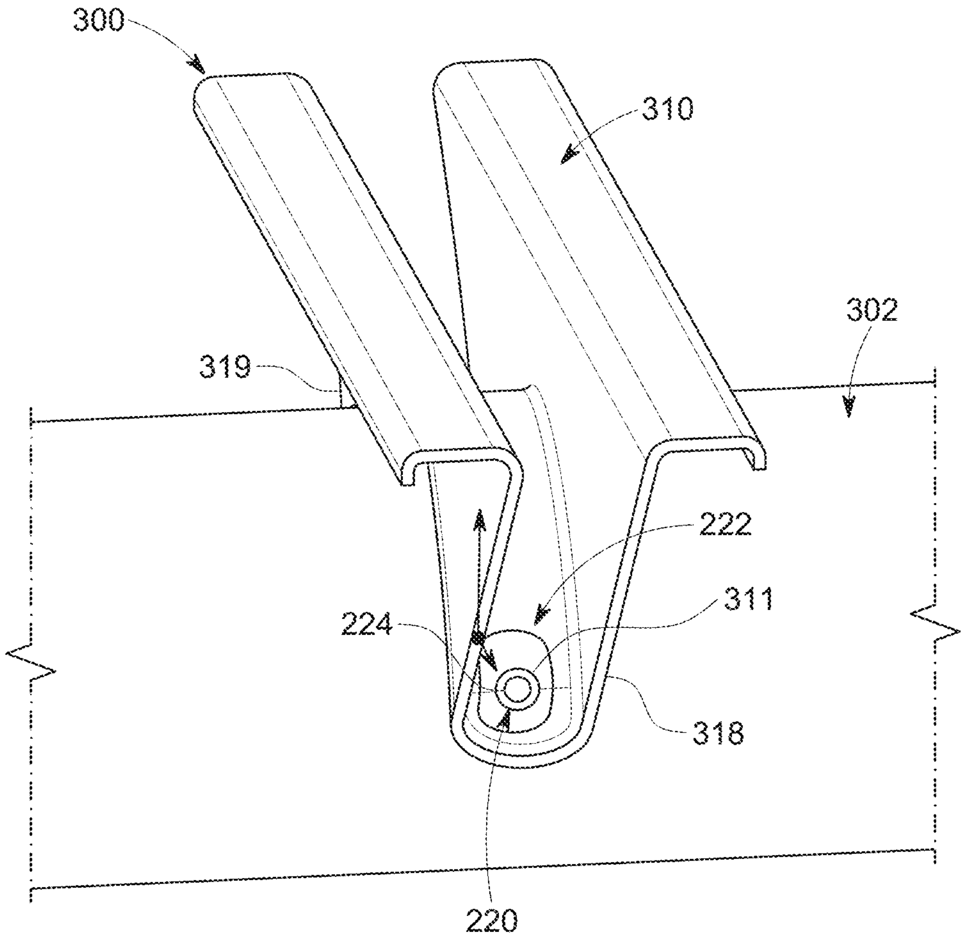

FIGS. 3A and 3B illustrate another embodiment of a solar module support rail assembly 300 installed at a torque tube 302. FIG. 3A shows a perspective view from a longitudinal side of the solar module support rail assembly 300 installed at the torque tube 302, and FIG. 3B shows a perspective view from a radial side of the solar module support rail assembly 300 installed at the torque tube 302.

The solar module support rail assembly 300 can be configured for automated installation at a solar tracking system, for instance, using a robotic device, such as disclosed elsewhere herein. The illustrated embodiment of the solar module support rail assembly 300 includes a solar module support rail 310 and one or more fastening assemblies 220. And, for the illustrated embodiment, the solar module support rail 310 and one or more fastening assemblies 220 are configured to facilitate robotic installation at the torque tube 302.

The solar module support rail 310, of solar module support rail assembly 300, can include at least two rail fixation apertures 311 and the solar module support rail assembly 300 can include at least two corresponding, complementary fastening assemblies 220. For example, the embodiment of the solar module support rail assembly 300 shown here includes the solar module support rail 310 with only two rail fixation apertures 311 and only two fastening assemblies 220 corresponding, and complementary, to the respective two rail fixation apertures 311. In particular, the solar module support rail assembly 300 can include the solar module support rail 310 having only two rail fixation apertures 311—one such rail fixation aperture 311 at one longitudinal end portion 318 of the solar module support rail 310 and the other such rail fixation aperture at an opposite longitudinal end portion 319 of the solar module support rail 310. Thus, the two rail fixation apertures 311, such as illustrated here, can be located at generally opposite longitudinal end portions of the solar module support rail 310, and the torque tube 302 can include two torque tube fixation apertures at corresponding generally opposite sides of the torque tube 302 where the longitudinal end portions 318, 319 interface with the torque tube 302. The longitudinal end portions 318, 319 of the solar module support rail 310 can include one or more non-planar surfaces, and the rail fixation apertures 311 can be located at non-planar surfaces of the longitudinal end portions 318, 319.

The one or more fastening assemblies 220, of solar module support rail assembly 300, can include at least the clamping plate 222 and the fastening member 224, for instance, as disclosed elsewhere herein. One fastening assembly 220 can fixate the solar module support rail 310 to the torque tube 302 at one longitudinal end portion 318 and another fastening assembly 220 can fixate the solar module support rail 310 to the torque tube 302 at the other, opposite longitudinal end portion 319. Thus, as disclosed elsewhere herein, the clamping plate 222 can include the clamping plate fixation aperture, and the clamping plate 222 can be configured to interface with (e.g., sit directly on) the solar module support rail 310, for instance, in alignment with the respective rail fixation aperture 311 at the solar module rail support 310. For instance, the clamping plate 222 can be configured to interface with (e.g., sit directly on) the solar module support rail 310 such that the clamping plate fixation aperture is aligned with the rail fixation aperture 311 at the solar module rail support 310. This can include, for instance as disclosed elsewhere herein, the clamping plate 222 as a non-planar member (e.g., a generally curved, such as "C" shaped, member) interfacing at the respective non-planar surfaces at the respective longitudinal end portions 318, 319 to help facilitate a generally flush interface between the clamping plate 222 and the solar module rail support 310. The fastening member 224 can be configured to be received at the clamping plate fixation aperture at the clamping plate 222 and at the rail fixation aperture 311 so as to fixate the clamping plate 222 at the solar module support rail 310 and to fixate the solar module support rail 310 at the torque tube 302 (e.g., at a torque tube fixation aperture). The fastening member 224 can be any one or more of a variety of fastening members suited for the intended solar tracking system application of the solar module support rail 210, including, as disclosed elsewhere herein as one example, the fastening member 224 as a blind rivet that is configured to fixate the clamping plate 222 to the solar module support rail 310 and to fixate the solar module support rail 310 to the torque tube 302.

As disclosed elsewhere herein, the one or more fastening assemblies 220 can be configured to transfer force loads between the torque tube 302 and the solar module support rail 310. As one example, the clamping plate 222 disclosed herein can be configured to help effectively transfer force loads between the torque tube 302 and the solar module support rail 310. For instance, the respective non-planar, generally curved clamping plate 222 can be configured to wrap around the respective longitudinal end portion 318, 319 of the solar module support rail 310 to thereby help the clamping plate 222 to transfer force loads from the torque tube 302 to the solar module support rail 310 and/or to transfer force loads from the solar module support rail 310 to the torque tube 302.

Figure 4:
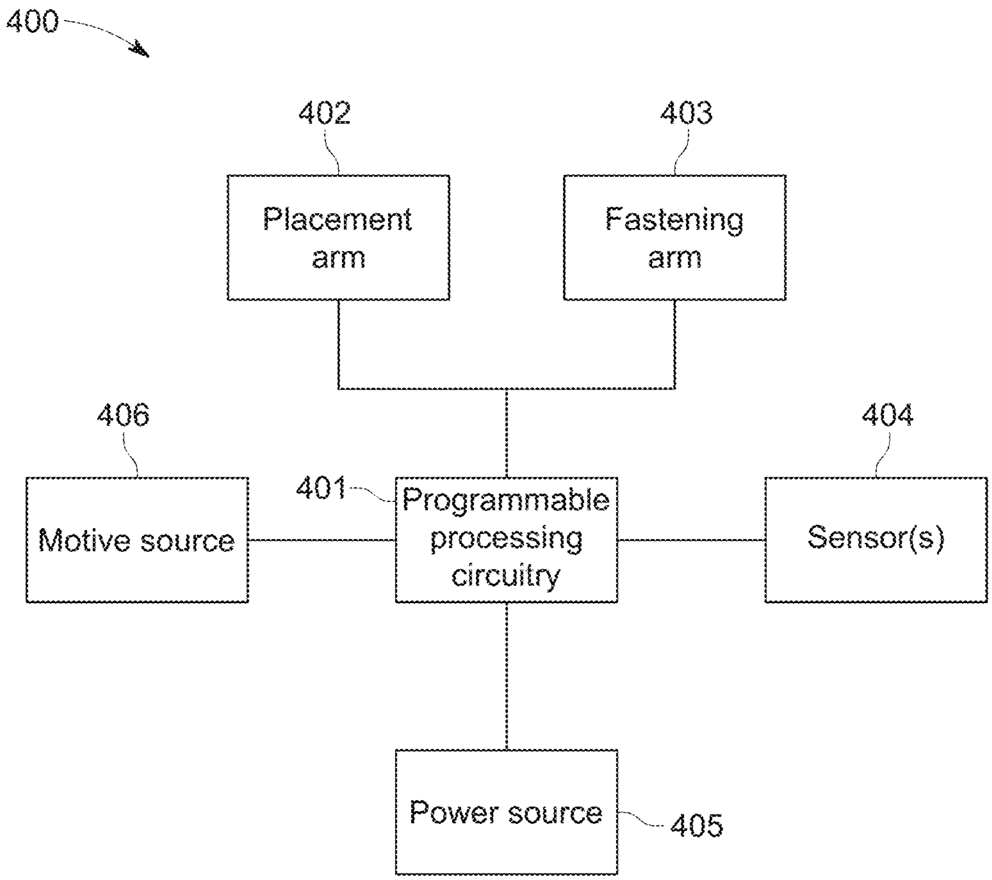
FIG. 4 is a schematic block diagram of an embodiment of a robotic device.

FIG. 4 is a schematic block diagram of an embodiment of a robotic device 400. The robotic device 400 illustrated at FIG. 4 can be one example embodiment of the robotic device disclosed elsewhere herein as used to place and/or fixate one or more solar module support rails at a torque tube of the solar tracking system.

The robotic device 400 can include programmable processing circuitry 401 and associated non-transitory storage medium such that robotic device can store and execute computer-readable, programmed instructions via the programmable processing circuitry 401 and associated non-transitory storage medium. In addition, the robotic device can include components in communication with (e.g., wired or wirelessly coupled to) programmable processing circuitry 401 such that in executing the computer-readable, programmed instructions via the programmable processing circuitry 401 the robotic device 400 can carry out specified actions. As shown for the illustrated embodiment, the robotic device 400 can include a placement arm 402 coupled to the programmable processing circuitry 401, a fastening arm 403 coupled to the programmable processing circuitry 401, one or more sensors 404 coupled to the programmable processing circuitry 401, a power source 405 coupled to the programmable processing circuitry 401, and a motive source 406 coupled to the programmable processing circuitry 401. The motive source 406 can be configured to move the robotic device relative to a torque tube of a solar tracking system. For example, the motive source 406 can include a motor and one or more wheels such that as the robotic device 400 actuates the motive source 406 the one or more wheels can be caused to move the robotic device 400 relative to a torque tube of a solar tracking system. The power source 405 can be configured to provide power to one or more power-consuming components at the robotic device 400 and can, for instance, be a rechargeable battery in examples where the motive source 406 is an electrical motor or other electrical motive source. The placement arm 402 can be configured to hold at least one solar module support rail, such as any of the rail embodiments disclosed elsewhere herein. The fastening arm 403 can be configured (e.g., after the placement arm 402 has placed the solar module support rail at the torque tube) to install a fastening assembly at the solar module support rail to fixate the solar module support rail at the torque tube, such as disclosed for any of the fastening assembly embodiments disclosed elsewhere herein as installed at the solar module support rail to fixate the solar module support rail at the torque tube.

As noted, the robotic device 400 can further include one or more sensors 404 coupled to the programmable processing circuitry 401. One such exemplary sensor 404 that can be included at the robotic device 400 is an aperture locating sensor. The aperture locating sensor can be configured to locate a torque tube fixation aperture at a location along the torque tube. For instance, the aperture locating sensor at the robotic device 400 can be configured to locate the torque tube fixation aperture at the location along the torque tube while the placement arm 402 of the robotic device 400 holds the first solar module support rail. The aperture locating sensor can provide data to the programmable processing circuitry 401, and the programmable processing circuitry 401 can be configured to compare this received data from the aperture locating sensor to a preset torque tube fixation aperture identification threshold. For instance, the aperture locating sensor can be an optical aperture locating sensor and the programmable processing circuitry 401 can be programmed with computer-readable image pattern-recognition instructions that cause the programmable processing circuitry 401 to use image data from the optical aperture locating sensor in comparison to prior image data to discern one or more patterns to thereby determine the preset torque tube fixation aperture identification threshold. When the programmable processing circuitry 401 determines that the image data from the aperture locating sensor meets or exceeds the preset torque tube fixation aperture identification threshold, the programmable processing circuitry 401 can be configured to actuate the placement arm 402, holding the solar module support rail, to place the solar module support rail relative to the determined/identified fixation aperture.

For instance, the first solar module support rail can include at least one support rail fixation aperture, and the robotic device 400 can hold the first solar module support rail at the placement arm 402 with a location of the at least one support rail fixation aperture registered at the programmable processing circuitry 401 of the robotic device 400 (e.g., the robotic device can hold the first solar module support rail with the location of the at least one support rail fixation aperture, registered at the robotic device, relative to the placement arm of the robotic device holding the first solar module support rail). Once the robotic device 400 has located the torque tube fixation aperture at the first location along the torque tube, the placement arm 402 of the robotic device 400, holding the first solar module support rail, can be actuated to place the first solar module support rail relative to the located first torque tube fixation aperture at the first location along the torque tube.

Various examples have been described. These and other examples are within the scope of the above disclosure.

What is claimed is:

1. A method for installing a solar module support rail at a solar tracking system, the method comprising the steps of:

using an aperture locating sensor at a robotic device to locate a first torque tube fixation aperture at a first location along a torque tube and placing, via the robotic device, a first solar module support rail at the first location along the torque tube of the solar tracking system, wherein the robotic device comprises a placement arm and the first solar module support rail comprises a support rail fixation aperture, wherein, when the placement arm holds the first solar module support rail, the robotic device logs a location of the support rail fixation aperture relative to the placement arm, and wherein the first solar module support rail is placed, via the placement arm of the robotic device, at the first location using the logged location of the support rail fixation aperture relative to the placement arm;

using the robotic device to fixate the first solar module support rail at the first location along the torque tube;

moving the robotic device to a second, different location along the torque tube;

using the aperture locating sensor at the robotic device to locate a second torque tube fixation aperture at the second, different location along the torque tube and placing, via the robotic device, a second solar module support rail at the second, different location along the torque tube; and using the robotic device to fixate the second solar module support rail at the second location along the torque tube.

2. The method of claim 1, wherein the placement arm holds the first solar module support rail while the aperture locating sensor at the robotic device is used to locate the first torque tube fixation aperture at the first location along the torque tube, and wherein the placement arm holds the second solar module support rail while the aperture locating sensor at the robotic device is used to locate the second torque tube fixation aperture at the second location along the torque tube.

3. The method of claim 2, wherein, when the aperture locating sensor at the robotic device locates the first torque tube fixation aperture at the first location along the torque tube, the robotic device actuates the placement arm, holding the first solar module support rail, to place the first solar module support rail relative to the located first torque tube fixation aperture at the first location along the torque tube.

4. The method of claim 1, wherein the robotic device comprises a fastening arm, and wherein, after placing the first solar module support rail at the first location along the torque tube, using the robotic device to fixate the first solar module support rail at the first location along the torque tube comprises using the fastening arm of the robotic device to couple at least a clamping plate and a fastening member at the placed first solar module support rail at the first location along the torque tube to fixate the first solar module support rail at the first location along the torque tube.

5. The method of claim 4, wherein the fastening member comprises a blind rivet that is set and fastened by the fastening arm at the placed first solar module support rail at the first location along the torque tube.

6. The method of claim 4, wherein the fastening arm of the robotic device is used to drive the fastening member through the clamping plate and then through the first solar module support rail.

7. The method of claim 6, wherein the first solar module support rail comprises a support rail fixation aperture, wherein the fastening arm holds the clamping plate and the fastening member, and wherein the fastening arm of the robotic device places the clamping plate at the first solar module support rail in alignment with the support rail fixation aperture and then drives the fastening member through the clamping plate and then through the support rail fixation aperture.

8. The method of claim 6, wherein, when the first solar module support rail is placed at the torque tube, the fastening arm of the robotic device is moved toward the first solar module support rail in a direction opposite the torque tube to drive the fastening member through the clamping plate and then through the first solar module support rail.

9. A solar module support rail assembly for automated installation at a solar tracking system, the solar module support rail assembly comprising:

a solar module support rail comprising a central longitudinal region and a rail fixation aperture, the central longitudinal region comprising a first curved surface that spans a length along the central longitudinal region, the rail fixation aperture at the first curved surface; and a fastening assembly comprising a clamping plate and a fastening member, the clamping plate comprising a second curved surface and a clamping plate fixation aperture that is at the second curved surface, the clamping plate configured to interface with the solar module support rail such that the second curved surface wraps around at least a portion of the first curved surface and the clamping plate fixation aperture aligns with the rail fixation aperture, the fastening member configured to be received at the clamping plate fixation aperture and the rail fixation aperture to fixate the clamping plate at the solar module support rail and to fixate the solar module support rail to a torque tube.

10. The assembly of claim 9, wherein, when the fastening member is received at the clamping plate fixation aperture and the rail fixation aperture to fixate the clamping plate at the solar module support rail and to fixate the solar module support rail to a torque tube, the clamping plate sits directly on the solar module support rail with the clamping plate fixation aperture aligned with the rail fixation aperture.

11. The assembly of claim 10, wherein the clamping plate comprises a non-planar plate.

12. The assembly of claim 11, wherein the non-planar plate comprises a curved longitudinal cross-sectional geometry.

13. The assembly of claim 12, wherein the non-planar plate comprises a C shaped plate member, and wherein, when the fastening member is received at the clamping plate fixation aperture and the rail fixation aperture to fixate the clamping plate at the solar module support rail and to fixate the solar module support rail to a torque tube, the C shaped plate member sits directly on the first curved surface of the solar module support rail with the clamping plate fixation aperture aligned with the rail fixation aperture at the first curved surface of the solar module support rail.

14. The assembly of claim 12, wherein the fastening member is a blind rivet that is configured to fixate the clamping plate in direct contact with solar module support rail when the blind rivet is received at the clamping plate fixation aperture and the rail fixation aperture.

15. The assembly of claim 14, wherein the rail fixation aperture is a single rail fixation aperture at a central longitudinal region at the solar module support rail.

16. The assembly of claim 14, wherein the rail fixation aperture is a first rail fixation aperture at one longitudinal end portion of the solar module support rail, and wherein the solar module support rail further comprises a second rail fixation aperture at another, opposite longitudinal end portion of the solar module support rail.

17. The assembly of claim 9, wherein the clamping plate and the fastening member are configured to be fastened at the solar module support rail by a robotic device moved toward the first solar module support rail in a direction opposite the torque tube.

* * * * *